United States Patent [19]
Jasinski

[11] Patent Number: 5,128,934
[45] Date of Patent: Jul. 7, 1992

[54] MULTIPLE TRANSMITTER MESSAGE TRANSMISSION SYSTEM AND METHOD THEREFOR

[75] Inventor: Leon Jasinski, Ft. Lauderdale, Fla.

[73] Assignee: Motorola, Inc., Schaumburg, Ill.

[21] Appl. No.: 546,284

[22] Filed: Jun. 29, 1990

[51] Int. Cl.⁵ .............................. H04B 5/04; H04J 4/00
[52] U.S. Cl. ................................. 370/84; 340/825.44;
 340/825.47; 379/58; 379/59; 455/33.1;
 455/56.1; 455/57.1
[58] Field of Search ......... 370/95.1, 84, 94.2;
 340/825.44, 825.47; 379/58, 59, 60; 455/32, 33,
 56, 57

[56] References Cited

U.S. PATENT DOCUMENTS

| | | | |
|---|---|---|---|
| 4,696,051 | 9/1987 | Breeden | 455/33 |
| 4,721,955 | 1/1988 | Dunkerton et al. | 340/825.47 |
| 4,918,437 | 4/1990 | Jasinski et al. | 340/825.44 |
| 4,930,124 | 5/1990 | deBoisseron et al. | 370/94.2 |
| 4,968,966 | 11/1990 | Jasinski et al. | 379/59 |
| 4,984,290 | 1/1991 | Levine et al. | 455/33 |

Primary Examiner—Douglas W. Olms
Assistant Examiner—Russell W. Blum
Attorney, Agent, or Firm—Philip P. Macnak; Vincent B. Ingrassia; William E. Koch

[57] ABSTRACT

A multiple transmitter message transmission system provides for the distribution of message packets from a central transmitter station to a plurality of remote transmitter stations on a common channel on which the messages are delivered to a plurality of paging receivers operating within the system. The messages are delivered by simulcast transmissions from the central transmitter station and the plurality of remote transmitter stations. The system is capable of functioning with a variety of signaling protocols, and reduces the number of channels required for message distribution and delivery to a single common channel.

26 Claims, 13 Drawing Sheets

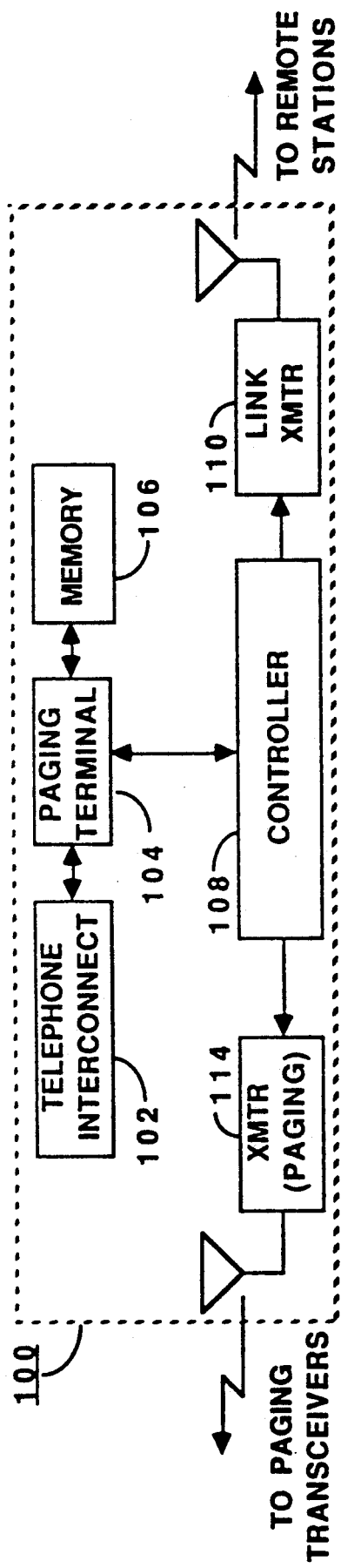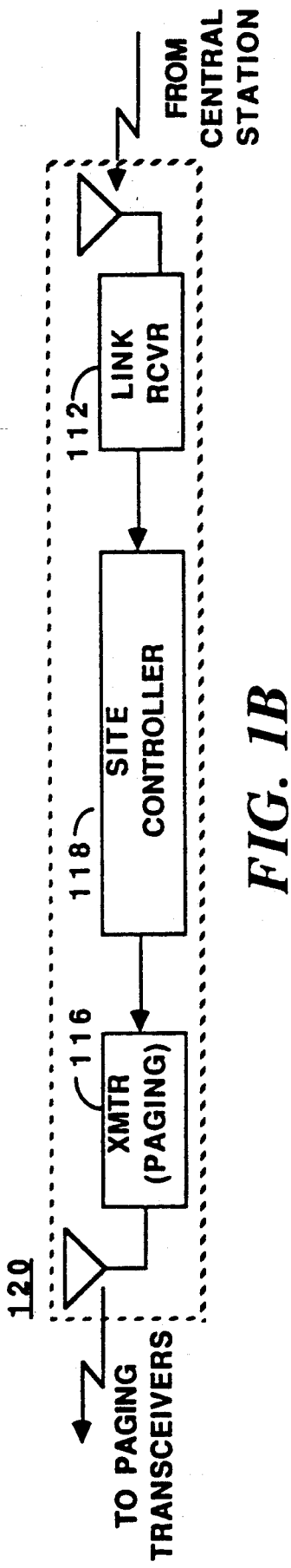
FIG. 1A PRIOR ART
FIG. 1B PRIOR ART

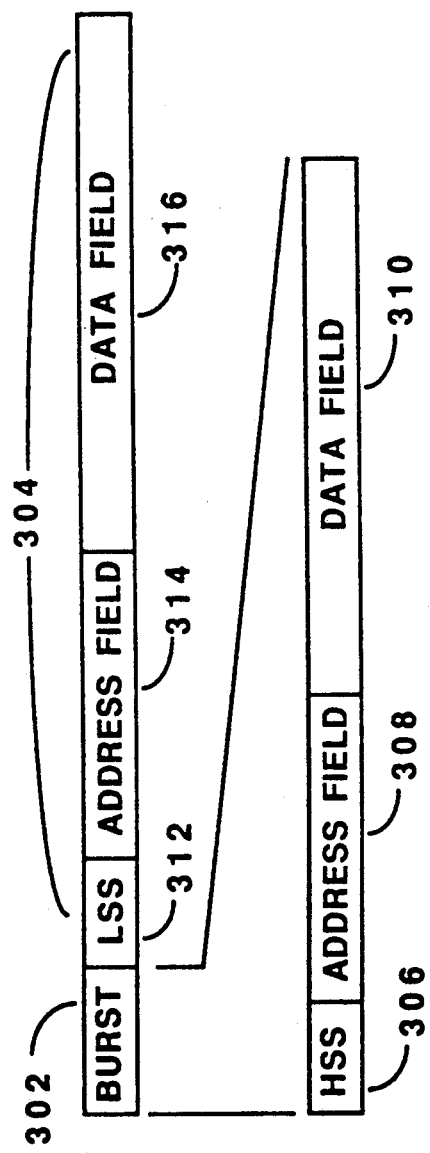
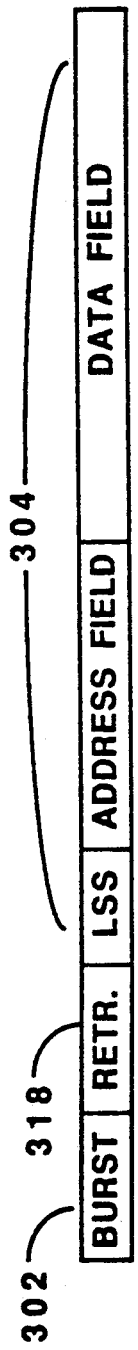
FIG. 4A
FIG. 4B

MULTIPLE TRANSMITTER MESSAGE TRANSMISSION SYSTEM AND METHOD THEREFOR

BACKGROUND OF THE INVENTION

1. Field of the Invention

The invention relates generally to the field of multiple transmitter message transmission systems, and more particularly to a multiple transmitter message transmission system utilizing a common communication channel for message distribution throughout the system and message delivery to a portable communication receiver.

2. Description of the Prior Art

Multiple transmitter message transmission systems have been widely used for the delivery of analog and digital messages. Once such prior art multiple transmitter message transmission system in wide use today is a simulcast transmission paging system which transmitted analog voice and digital data messages to a plurality of portable communication receivers, such as paging receivers operating within the system. Such prior art communication systems have utilized multiple transmitters to provide transmission coverage for large geographic areas, such as a large metropolitan area. FIG. 1A shows an electrical block diagram of the central transmitter facility 100 for a prior art paging system. Messages were inputted into the system by a user, generally through a telephone interconnect 102 for connection to the PSTN (public switched telephone network). As the messages were received in the system, they were processed by a paging terminal, which encoded the received messages for transmission. The encoded messages were then generally stored in a queue in a memory 106 prior to transmission. Prior to the actual transmission of the stored messages, the stored messages were recalled from memory 106 by the controller 108 and then distributed to each of the remote transmitter stations 120, as shown in FIG. 1B. The distribution of the recalled messages was accomplished using dedicated phone lines coupling the remote transmitter stations to the central transmitter facility, or as shown in FIGS. 1A and 1B, through the use of dedicated RF (radio frequency) or microwave link transmitter 110 located at the central transmitter facility and a dedicated RF or microwave link receiver 112 located at each remote transmitter station 120. The distribution channel utilized in the prior art systems was distinct from that of the paging channel used to deliver the messages to the paging receivers. As the messages were received at each of the remote transmitter stations 120, the remote transmitter station transmitter 116 was keyed by the site controller 118 while the central transmitter station transmitter 114 was being keyed by the central transmitter station controller 108. Delay equalization was provided at the central transmitter station transmitter 114 and the remote transmitter station transmitters 116 to allow simulcast transmission of the messages. The use of link transmitters and receivers in the prior art transmission systems added to both the complexity of the transmission system and to the cost of the transmission system. In addition, because a second RF channel was required for the link transmissions, licenses for two RF channels were required. In large metropolitan areas where a large number of RF channels were in use, it was often difficult, if not impossible, to obtain the required licenses to establish new paging services. There is a need to provide a multiple transmitter message transmission system which reduces the complexity and the cost of the system, and which also reduces the number of channels required for the operation of the paging system.

SUMMARY OF THE INVENTION

It is an object of the present invention to provide a multiple transmitter message transmission system which reduces the number of transmission channels required for operation of the message transmission system.

It is a further object of the present invention to provide a multiple transmitter message transmission system which utilizes a single transmission channel for message distribution and message delivery.

It is a further object of the present invention to provide a multiple transmitter message transmission system which maintains message throughput on the single transmission channel.

A multiple transmitter message transmission system provides systemwide message distribution to a plurality of transmission areas on a common communication channel which is also utilized for the delivery of a message intended for a communication receiver operating within the system. The system includes a primary transmitter which provides message packet distribution at a first predetermined data bit rate on the common channel for distribution throughout the plurality of transmission coverage areas, and further provides message delivery to a communication receiver for which the messages are intended within a predetermined on of the plurality of transmission areas, at a second data bit rate on the common channel. Receivers located within each of a plurality of co-located transmission areas receive the message packet transmitted at the first data bit rate on the common channel. The receivers are coupled to secondary transmitters which provide transmission coverage for each of the other of the plurality of transmission areas and are responsive to the message packet reception for subsequently transmitting the messages at the second data bit rate on the common channel for delivery of the messages within the other of the plurality of transmission coverage areas.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

FIG. 1A is an electrical block diagram of a prior art paging central transmitter facility.

FIG. 1B is an electrical block diagram of a prior art paging remote transmitter station.

FIG. 4A is a timing diagram showing the signaling format of the multiple transmitter message transmission system of the present invention utilizing single message packet transmission.

FIG. 4B is a timing diagram showing the signaling format of the multiple transmitter message transmission system of the present invention utilizing message packet re-transmission.

DESCRIPTION OF THE PREFERRED EMBODIMENTS

Figure 2A:
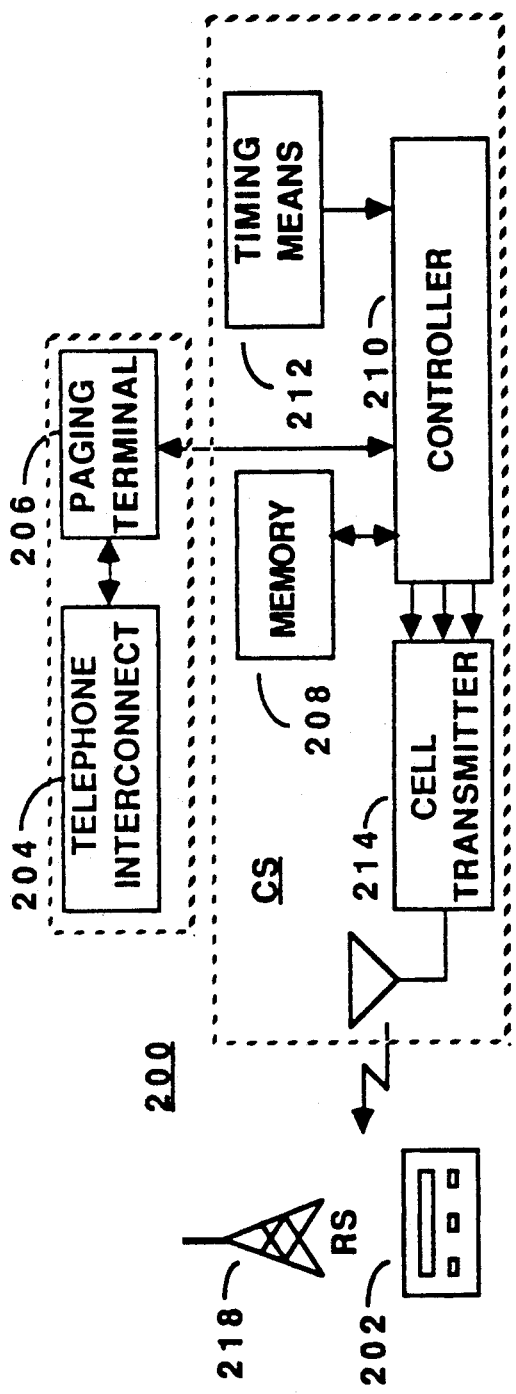
FIG. 2A is an electrical block diagram of the central transmitter station for a multiple transmitter message transmission system of the present invention.

Referring to the figures, FIGS. 2 through 8 show the multiple transmitter message transmission system of the present invention. In particular, FIG. 2A shows an electrical block diagram of the central transmitter station 200. Messages intended for communication receivers, such as paging receivers 202 operating within the system are inputted by the message originator through the public switched telephone network (PSTN). The messages may be inputted directly from a telephone keypad for numeric data messages, or using a terminal entry device for alphanumeric data messages. A telephone interconnect 204 couples the messages from the public switched telephone network to a paging terminal 206 which processes the messages for transmission in a manner well known in the art. The paging terminal 206 formats the received messages for transmission together with addresses identifying the paging receivers to which the messages are intended. The messages are then temporarily stored in message queues in a memory 208. Memory 208 is implemented using any of a number of well known memory devices capable of storing quantities of information, such as a random access memories (RAM), or a hard disc drives. The format in which the messages are stored is a function of the particular signaling protocol in use within the message transmission system. There are many well known signaling protocols in use today, such as the POCSAG signaling protocol and the Golay Sequential Code signaling protocol, however, as will be appreciated from the description to follow, the system of the present invention is not limited to any particular signaling protocol. A controller 210 is coupled to the paging terminal 206 for controlling the transmission of the messages stored in within the message queues of memory 208. A timing means 212 couples to the controller 210 for providing timing information which is utilized by the controller 210. Timing means 212 is preferably a high stability clock reference source, such as provided by crystal controlled or atomic frequency standards. Timing means 212 generates timing signals used by the controller 210 to control the distribution of the inputted messages throughout the message transmission system, and also provides an accurate clock reference for time synchronizing all transmitters within the message transmission system for simulcast message transmission, as will be explained below. During a first predetermined time interval, messages are recovered from the message queues in the memory 208 by controller 210. The messages are then transmitted in message packets including transmitter synchronization information at a first data bit rate by a transmitter 214 to the remote transmitter stations 218 co-located within geographic areas surrounding the central transmitter station 200. The message packet transmissions provide message distribution to each of the remote transmitter stations 218 located throughout the transmission region using the same radio frequency channel as used to deliver the messages to the paging receivers, as will be described in detail below.

Figure 2B:
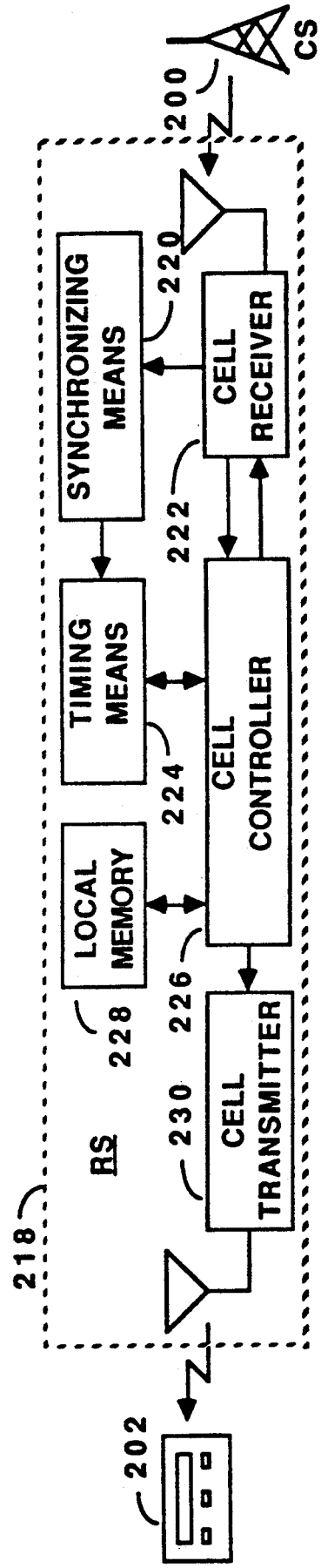
FIG. 2B is an electrical block diagram of a remote transmitter station for the multiple transmitter message transmission system of the present invention.

The remote transmitter stations 218 are shown in the electrical block diagram of FIG. 2B. The message packets transmitted from the central transmitter station 200 are received and detected by cell receivers 220 located at each of the remote transmitter stations 218. The output of cell receiver 220 couples to a synchronizing means 222 which is responsive to the transmitter synchronization information transmitted in the message packets for synchronizing the timing signals generated by timing means 224 in a manner well known in the art. Timing means 224 is preferably a temperature compensated crystal controlled oscillator (TCXCO) which is maintained at a predetermined frequency by the transmitter synchronization information. The output of cell receiver 220 also couples to a cell controller 226. The cell controller 226 is responsive to the timing signals generated by timing means 224 for controlling the reception and temporary storage of the messages received in the message packets into a local memory 228. Local memory 208 is implemented using any of a number of well known memory devices capable of storing quantities of information, such as random access memories (RAM), or hard disc drives. After the message packets have been received by each of the remote transmitter stations 218 co-located within geographic areas surrounding the central transmitter station 218, the central transmitter station transmitter 214, and each of the remote transmitter station transmitters 230, simulcast transmit the messages during a second predetermined time interval at a second predetermined data bit rate for delivery of the messages to the paging receivers 202 operating within the message transmission system. The signaling format used for distribution of the message packets from central transmitter station 200, and the signaling format used for the delivery of the messages to the paging receivers will be described below.

Figure 3A:
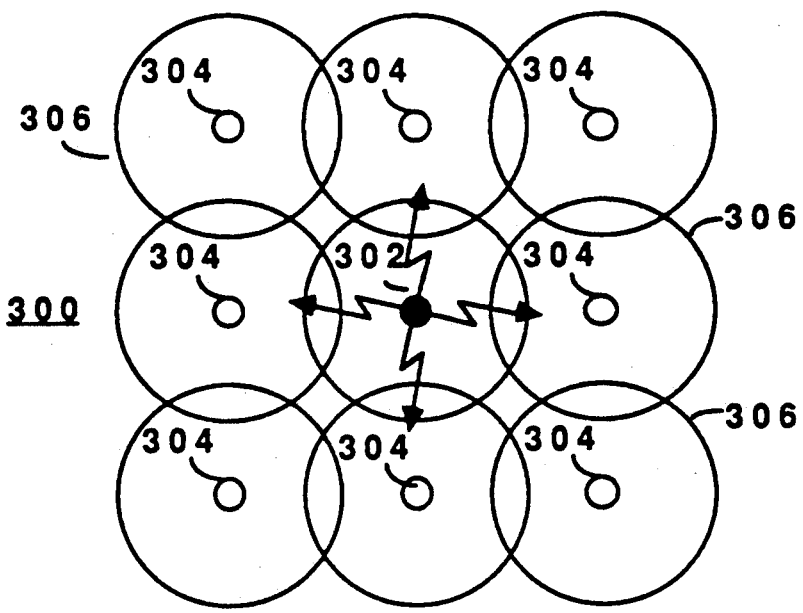
FIG. 3A is a pictorial diagram of the multiple transmitter message transmission system of the present invention which utilizes a single message packet transmission.

Depending upon the size of the message transmission system, the message packets may be distributed directly to each of the co-located remote transmitter stations from the central transmitter station, as would occur in small message transmission systems. It will be appreciated, large message transmission systems may require re-transmission of the message packets, as will be described below. FIG. 3A is a pictorial diagram of a relatively small multiple transmitter message transmission system 300 which can utilize a single message packet transmission for message distribution throughout the message transmission system 300. As shown in FIG. 3A, the message transmission system 300 comprises a central transmitter station 302 and a plurality of remote transmitter stations 304 organized into transmission cells 306 defining geographic coverage areas. It will be appreciated that FIG. 3A is only representative of the configuration of an actual message transmission system, and that more or less transmitters may be utilized than shown. The actual configuration of the message transmission system is based upon many factors, such as the size of the geographic area for which transmission coverage is to be provided, the type of terrain within the transmission coverage area, the transmitter output power provided, and the height of the transmission antennas, just to name a few. Messages, as they are received at the central transmitter station 302 are transmitted as a message packet during a first predetermined message distribution time interval on the common paging channel to each of the plurality of remote transmitter stations 304 which are co-located about the central transmitter station and which are within range of the central transmitter station transmitter. After the message packet has been distributed to each of the remote transmitter stations 304, the central transmitter station 302 and the remote transmitter stations 304 simulcast transmit on the common channel during a predetermined message delivery time interval.

Figure 3B:
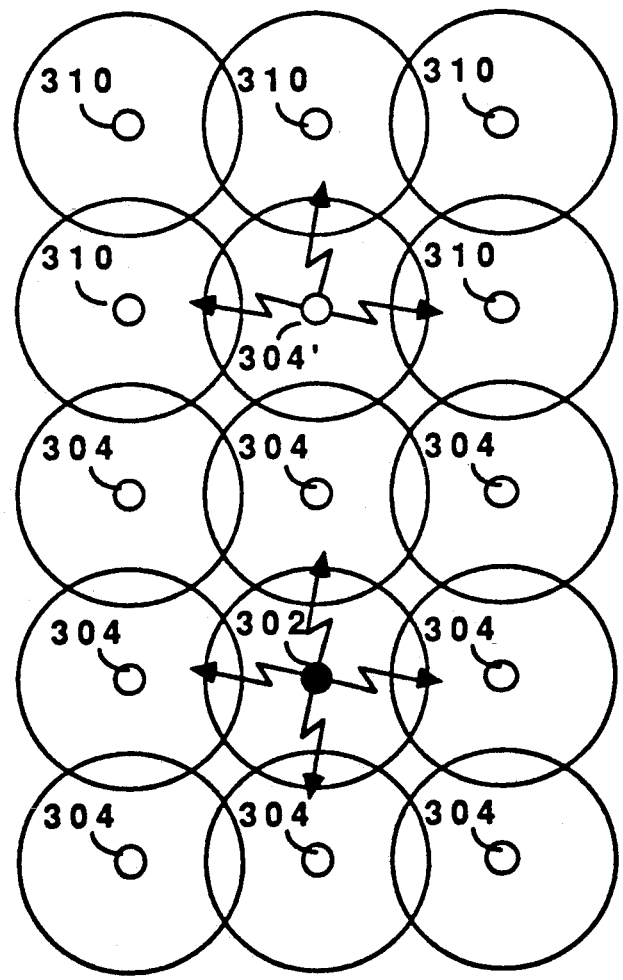
FIG. 3B is a pictorial diagram of the multiple transmitter message transmission system of the present invention which utilizes message packet re-transmission.

As the size of the message transmission system increases, the central transmitter station will eventually not be able to communicate directly with each of the remote transmitter stations within the message transmission system. FIG. 3B is a pictorial diagram of such a multiple transmitter message transmission system. In this instance only a portion of the remote transmitter stations identified as remote transmitter stations 304 and 304′ are within range of transmissions from the central transmitter station. In this instance, message re-transmission is required. A selected one of the plurality of remote transmitter stations 304′ functions as a repeater in a manner well known in the art, to re-transmit the message packet on the common channel during a second predetermined message distribution time interval, to the remote transmitter stations 310 which are beyond the range of the central transmitter station. After the message packet has been distributed to each of the remote transmitter stations 310, each of the groups of remote transmitter stations 304, 304′, 310 and the central transmitter station 302 simulcast transmit the messages on the common channel during the predetermined message delivery time interval for delivery of the messages to the paging receivers.

FIG. 4A is a timing diagram showing the signaling format of the preferred embodiment of the present invention. As shown in FIG. 4A, the message packet is distributed from the central transmitter station to the remote transmitter stations on a common radio frequency channel during the predetermined message distribution time interval 302, identified as a "burst", or "burst out" time interval. Included within the message packet transmitted during distribution time interval 302 is a high speed transmitter synchronization (HSS) code word 306 which is added to the message packet at the central transmitter station, and which allows the remote transmitter station controllers to obtain both bit and frame synchronization with the received message packet transmitted at the first predetermined data bit rate, which is a high speed data bit rate. The high speed transmitter synchronization code word 306 is transmitted in the preferred embodiment of the present invention at either 19.2 kilobits per second or 39.4 kilobits per second, and comprises an alternating binary one/zero bit pattern to provide bit synchronization, followed by a predetermined bit pattern to provide frame synchronization, in a manner well known in the art. It will be appreciated that other data distribution rates may be utilized as well. Following the high speed transmitter synchronization code word 306 is an address field 308 including the addresses of pagers for which messages are intended, followed by a message data field 310 including the messages corresponding to the pager addresses. It will be appreciated the actual format of the address and data fields are a function of the particular signaling format being utilized within the system. Other signaling formats, such as those which organize the messages into a message pattern comprising alternating address and data fields may be utilized as well.

After the message packet has been distributed to each of the remote transmitter stations, the remote transmitter stations and the central transmitter station simulcast transmit the messages on the common radio frequency channel during the predetermined message delivery time interval 304. Included within the messages transmitted during the message delivery time interval 304 is a low speed receiver synchronization (LSS) code word 312 which is added to the messages at each of the remote transmitter station, and which allows the paging receivers to obtain both bit and frame synchronization with the received message packet transmitted at the second predetermined data bit rate, or low speed data bit rate. The low speed receiver synchronization code word 312 is transmitted in the preferred embodiment of the present invention at either 600 bits per second or 1200 bits per second, and comprises an alternating binary one/zero bit pattern transmitted to provide bit synchronization, followed by a predetermined bit pattern to provide frame synchronization, in a manner well known in the art. It will be appreciated that other message delivery rates may be utilized as well. Following the low speed receiver synchronization code word 312 is the address field 314 including the addresses of pagers for which messages are intended, followed by the message data field 316 including the messages corresponding to the pager addresses. It will be appreciated that the format of the address field 314 and the data field 316 will be the same as the format of the address field 308 and the data field 310.

While the delivery of the messages from the central and remote transmitters has been described above as being accomplished utilizing simulcast message transmission, it will be appreciated the message delivery can also be provided in some instances using sequential transmissions originating from the remote transmitter stations. The message delivery can also be provided using sequential/simulcast transmissions, wherein the messages are simulcast transmitted from selected groups of remote transmitter stations, each group being selected for transmission in sequence. When the remote transmitter stations within any group are selected so that the message transmissions do not overlap, a significant reduction in system complexity can be achieved by minimizing the synchronization requirements for conventional simulcast transmission.

Table I below provides an indication of the transmission utilization efficiency of the message transmission system of the present invention for different high speed distribution data transmission rates and low speed delivery data transmission rates.

TABLE I

| Data Distribution Bit Rate | Message Delivery Bit Rate | Channel Overhead |
|---|---|---|
| 19.2 kbits/second | 600 bits/second | 3.25% |
| 19.2 kbits/second | 1200 bits/second | 6.5% |
| 38.4 kbits/second | 600 bits/second | 1.625% |
| 38.4 kbits/second | 1200 bits/second | 3.25% |

As shown in Table I, the channel utilization efficiency, indicated by the channel overhead figure, is the ratio of the time utilized to distribute the message packets from the central transmitter station to the remote transmitter stations and the time utilized to deliver the messages to the paging receivers. The channel overhead is a function of the transmission rates selected for distributing the message packet and the transmission rates selected for delivering the message to the paging receivers. As an example, as shown in Table I for a 1200 baud signaling format, such as a POCSAG signaling system, utilized for message delivery, and for a message packet distribution data bit rate of 19.2 kilobits per second, the channel overhead is six and one-half percent. In contrast, for a message packet distribution data bit rate of 38.4 kilobits per second and a 600 baud signaling format, the channel overhead is one and five-eights percent. It will be appreciated that the channel utilization efficiency information is presented for example only, and that other transmission bit rate combinations may be utilized as well, and that the actual transmission time represented by the channel overhead figure is a function of the actual message packet length being distributed.

FIG. 4B is a timing diagram showing the signaling format of the multiple transmitter message transmission system of the present invention utilizing message packet re-transmission. As shown in FIG. 4B, the message packet is distributed from the central transmitter station to the remote transmitter stations on the common radio frequency channel during the predetermined message distribution time interval 302, as previously described above. The message packet is then re-transmitted during a second predetermined message distribution time interval 318 from a selected one or more remote transmitter stations which function as repeaters, when all remote transmitter stations within the transmission system are unable to directly receive the message packet from the central transmitter station. After the message packet has been distributed to each of the remote transmitter stations, all remote transmitter stations and the central transmitter station simulcast transmit on the common radio frequency channel during the predetermined message delivery time interval 304, as previously described above. It will be appreciated, when message packet re-transmission is required, the channel overhead figure increases accordingly, reducing the time available to deliver messages to the paging receivers.

Figure 4C:
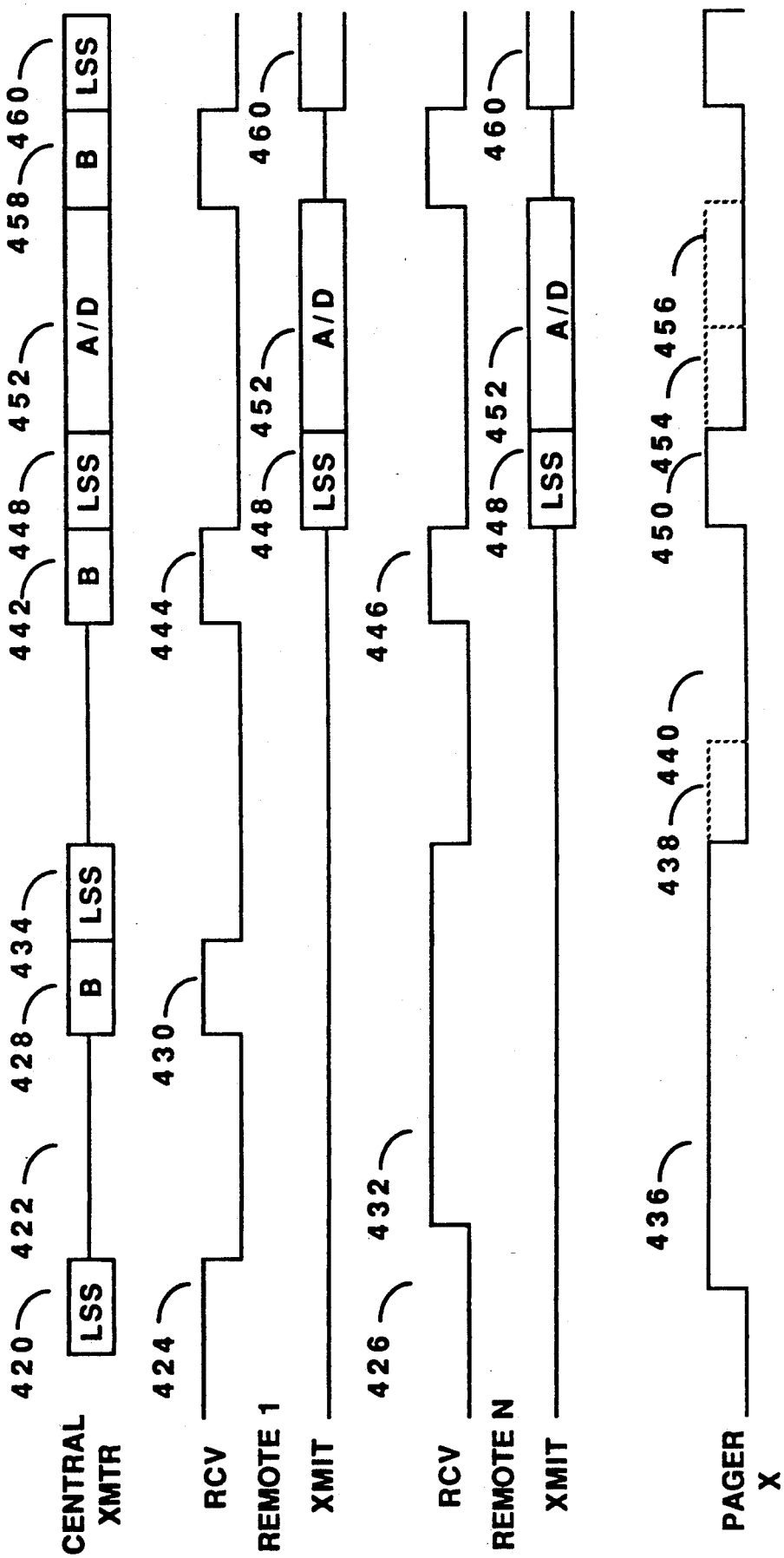
FIG. 4C is a timing diagram showing the synchronization of the multiple transmitter message transmission system of the present invention.

FIG. 4C is a timing diagram showing the manner in which the multiple transmitter message transmission system of the present invention is synchronized for message packet and message transmissions. When the channel is inactive for any period of time, such as during many evening and nighttime hours when message traffic is low, the remote transmitter stations must re-synchronize with the transmissions from the central transmitter station. As shown in FIG. 4C, the synchronization sequence is initiated by the central transmitter station, which preferably initially transmits the low speed synchronization (LSS) code word 420. The LSS code word 420 is followed by silent carrier during the address and data field time interval 422 as shown, or by idle code words filling the address and data fields. The operation of two remote transmitter stations and a pager are indicated for example in FIG. 4C. Remote transmitter station #1 is in the receiving mode at time interval 424 when the LSS code word 420 is transmitted. During the initial synchronization sequence, all remote transmitter stations are responsive to the LSS code word, and in this instance allows remote transmitter station #1 to obtain a first, or coarse synchronization with the central transmitter station. Remote transmitter station #N is shown as not in the receiving mode during time interval 426, and consequently misses the initial LSS code word 420 transmission. The central transmitter station continues the transmissions of synchronization information by next transmitting the high speed synchronization (HSS) code word followed with silent carrier, or idle code words during the burst time interval 428. Remote transmitter station #1, having obtained a coarse synchronization, begins receiving the HSS code word during time interval 430, completing the synchronization sequence with the central transmitter station. Remote transmitter station #N is in the receive mode during time interval 432, and is awaiting to synchronize with the LSS code word which is transmitted during time interval 434. When the remote station #N receives the LSS code word transmitted during time interval 434, coarse synchronization is obtained. Pager X is also in the receiving mode during time interval 436, which occurs during the second transmission of the LSS code word 434, allowing pager X to synchronize with the system transmissions. Pager X will continue in the receiving mode until the end of the address field 438, and then battery saves during the data field time interval 440 since no address information was transmitted. The central transmitter station begins transmission of messages together with the HSS code word at time interval 442. Remote transmitter station #1 continues the synchronization sequence, fine synchronizing during time interval 442 with the transmitted HSS code word and receives the transmitted message packet. Remote transmitter station #N completes the synchronization sequence, fine synchronizing during time interval 446 and also receives the transmitted message packet. The central transmitter station and the remote transmitter stations begin simulcast transmission beginning with the LSS code word during time interval 448, during which time pager X continues the synchronization maintenance sequence by synchronizing with the transmitted LSS code word during time interval 450. The central transmitter station and the remote transmitter stations continue simulcast transmission of the address and message fields during time interval 452, during which time pager X begins searching for its assigned address during time interval 454. When pager X detects its assigned address, pager X remains powered to receive the associated message during time interval 456, otherwise when an address is not received during time interval 454, the pager battery saves during time interval 456. The central transmitter station and the remote transmitter stations thereafter continue operation during time intervals 458, 460, as previously described, until messages are no longer present in the message queue to transmit.

In summary, during system synchronization, the remote transmitter stations begin the synchronization sequence by first obtaining a coarse synchronization using the LSS code word in the preferred embodiment of the present invention, and, which due to the lower data transmission rate provides a very reliable coarse synchronization. Thereafter the remote transmitter stations continue to maintain synchronization during the transmissions of the HSS code word. While only two cycles are shown during which silent carrier or idle code words are transmitted while the system is being synchronized, it will be appreciated, the actual number of synchronization transmissions which are required to obtain full system synchronization will depend greatly upon the length of time the system is inoperative, and the stability of the timing signal references at the remote transmitter stations.

Figure 5A:
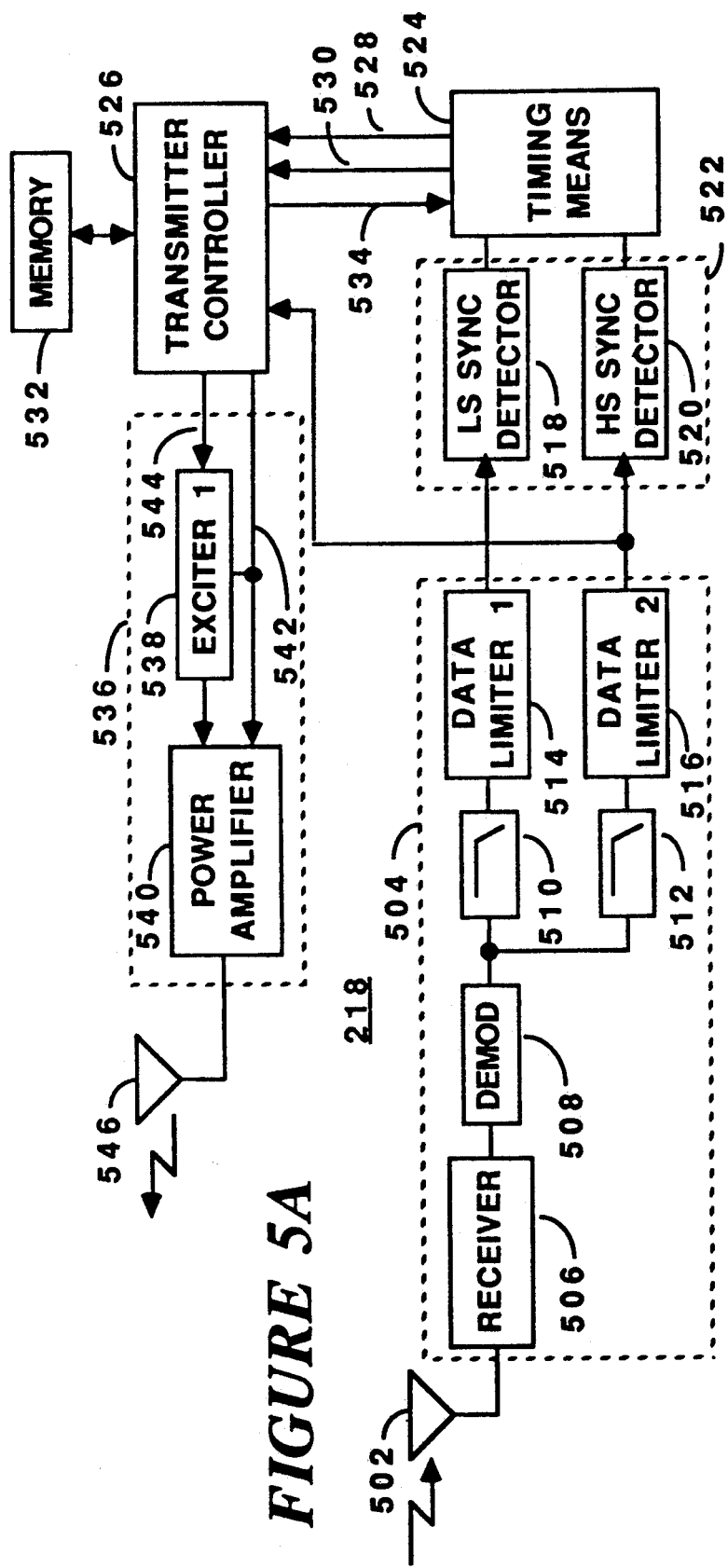
FIG. 5A is an electrical block diagram of the remote transmitter station for multiple transmitter message transmission system of the present invention.

FIG. 5A is an electrical block diagram of the remote transmitter station or secondary transmitter means 218 utilized for simulcast message transmission for the multiple transmitter message transmission system of the present invention. Message packet transmissions originating from the central transmitter station 200, or primary transmitter means, are received at the remote transmitter station 218 by antenna 502, which couples the received message packet signal to the input of the receiver section 504. The receiver section 504 comprises a conventional FM receiver 506, which is well known in the art, however unlike a receiver which receives data at only a single data bit rate, has an intermediate frequency (IF) bandwidth sufficiently wide to allow the receiver to receive both the low speed and high speed transmissions. In the preferred embodiment of the present invention, the IF bandwidth utilized to receive both the low and high speed data is on the order of 20 kiloHertz (KHz). As described above, the receiver 506 operates on the common radio frequency channel utilized for message delivery to the paging receivers. The IF output from the receiver 506 is coupled to the input of a conventional FM demodulator 508 which recovers the message packet information in a manner well known in the art. The output of the demodulator 508 couples to a first low pass filter section 510 and to a second low pass filter section 512. The cutoff frequency of the first low pass filter section 510 is optimized for reception of the low speed message information. The cutoff frequency of the second low pass filter section 512 is optimized for the reception of the high speed message information. Low pass filters, such as described above, are well known in the art. The output of low pass filter section 510 couples to the input of a first data limiter 514, and the output of low pass filter section 512 couples to the input of a second data limiter 516. In the preferred embodiment of the present invention, data limiter 514 is suitable for the detection of conventional FM modulated low speed data, while data limiter 516 is suitable for the detection of a spectrally efficient digital modulation (SEDM) modulated high speed data. The outputs from the first data limiter 514 and the second data limiter 516 are streams of binary data corresponding to the received low speed and high speed message information, respectively. The low speed message information provided at the output of the first data limiter 514 is coupled to the input of the low speed synchronization detector 518, which processes the low speed synchronization code word to obtain coarse synchronization information. The high speed message information provided at the output of the second data limiter 516 is coupled to the input of the high speed synchronization detector 520, which processes the high speed synchronization code word to obtain fine synchronization information. The coarse and fine synchronization information is coupled to inputs of timing means 524 to provide coarse and fine adjustment of the timing signals in a manner well known in the art. The output of the second data limiter 516 also couples to the input of transmitter controller 526 which controls the reception of the message packet transmitted from the central transmitter station. Transmitter controller 526 is preferably a microcomputer controller, which utilizes a microcomputer integrated circuit, such as an MC6809 microcomputer manufactured by Motorola. The timing means 524 provides two clock outputs, one providing a first recovered bit timing signal for enabling the reception of the message packet, and a second providing a second recovered bit timing signal for enabling the transmission of the message information. Timing means 524 includes a high stability temperature controlled crystal oscillator circuit coupled to divider circuits for providing low speed and high speed clock outputs corresponding to the first and second recovered bit timing signals, respectively, in a manner well known in the art. The high speed clock output 528 is provided which enables the transmitter controller 526 to receive the message packet information and to temporarily store the information in a memory 532. The memory 532 is preferably a random access memory (RAM) providing sufficient memory capacity for the storage of the message packet information. The low speed clock output 530 is also provided which enables the transmitter controller to recover the stored message packet information from the memory 532 for transmission at the low speed data bit rate. An output 534 is provided from the transmitter controller 526 which controls the selection of the source of synchronization information. When system operation has been suspended for a predetermined period of time as described above, the transmitter controller 526 enables the timing means 524 to utilize the coarse synchronization mode, synchronizing from the low speed synchronization code word. Thereafter, when system operation is established, the transmitter controller 526 enables the timing means 524 to utilize the fine synchronization mode to maintain fine synchronization with the high speed synchronization code word received in the transmitted message packets.

The stored message packet information is recovered from memory 532 when simulcast transmission of the message information is to start. The transmitter controller 526 begins the transmission sequence by keying the transmitter 536. Specifically, the transmitter controller keys the exciter 538 and the radio frequency (RF) power amplifier 540 via the keying control output 542. The recovered message information is coupled to the input of the transmitter exciter 538 via the data input line 544. A delay element (not shown) is provided in a manner well known in the art to equalize the transmission time of the message information required for simulcast message transmission. The exciter 538 modulates the recovered message information for transmission, and couples the modulated message information to the input of power amplifier 540. Power amplifier 540 boosts the message signal power level to the power level required for transmission which is then coupled to antenna 546 for transmission.

While the receiver section 504 was described above as having a common receiver coupled to separate data limiters for the recovery of low and high speed data, it will be appreciated separate receivers, operating on the common channel, such as a conventional paging receiver for reception of low speed data, and a second receiver for the reception of high speed data can be used as well.

Figure 5B:
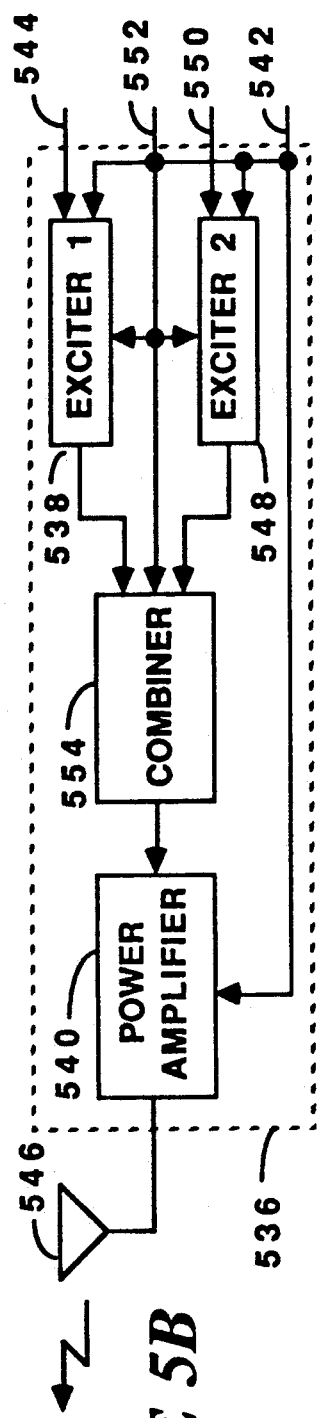
FIG. 5B is a portion of the electrical block diagram of the remote transmitter station providing message packet re-transmission for multiple transmitter message transmission system of the present invention.

FIG. 5B is an electrical block diagram of the transmitter portion of remote transmitter station providing message re-transmission for the multiple transmitter message transmission system of the present invention. The remote transmitter station which allows message packet re-transmission differs from the remote transmitter station of FIG. 5A, as shown in FIG. 5B. The operation of the exciter 1 538 and the power amplifier 540 are as described above. The transmitter controller 526 recalls the stored message packet information from the memory 532 (shown in FIG. 5A) and couples the message packet information to the input of a second exciter, or exciter 2 548. The transmitter controller 526 begins the high speed transmission sequence by keying the transmitter 536. Specifically, the transmitter controller 526 keys the second exciter 548 and the RF power amplifier 540. The recovered message information is coupled to the input of the second exciter 548 via the high speed data line 550. The second exciter 548 modulates the recovered high speed message packet information for transmission. The modulated message packet information is coupled to the input of combiner 554 which selectively couples the modulated message packet information to the input of the power amplifier 540 under control of the transmitter controller 526 via the exciter selector input 552. The high speed message packet is coupled from the output of the RF amplifier 540 to the antenna 546 for transmission.

Following the transmission of the high speed message packet, the transmitter controller 526 maintains the keying of the RF amplifier. The transmitter controller 526 de-keys the second exciter 548, and keys the first exciter 538 via keying control input 542 and the exciter selector input 552. The recovered low speed message information is coupled to the input of the first exciter 538 via the data input line 544. The exciter 538 modulates the recovered low speed message information for transmission following the delay provided for transmitter equalization, and couples the modulated message information to the input of combiner 554 which selectively couples the modulated low speed message information to the input of the power amplifier 540 under control of the transmitter controller 526 via the exciter selector input 552. Power amplifier 540 boosts the low speed message signal power level to the power level required for transmission which is then coupled to antenna 546 for transmission.

Figure 6A:
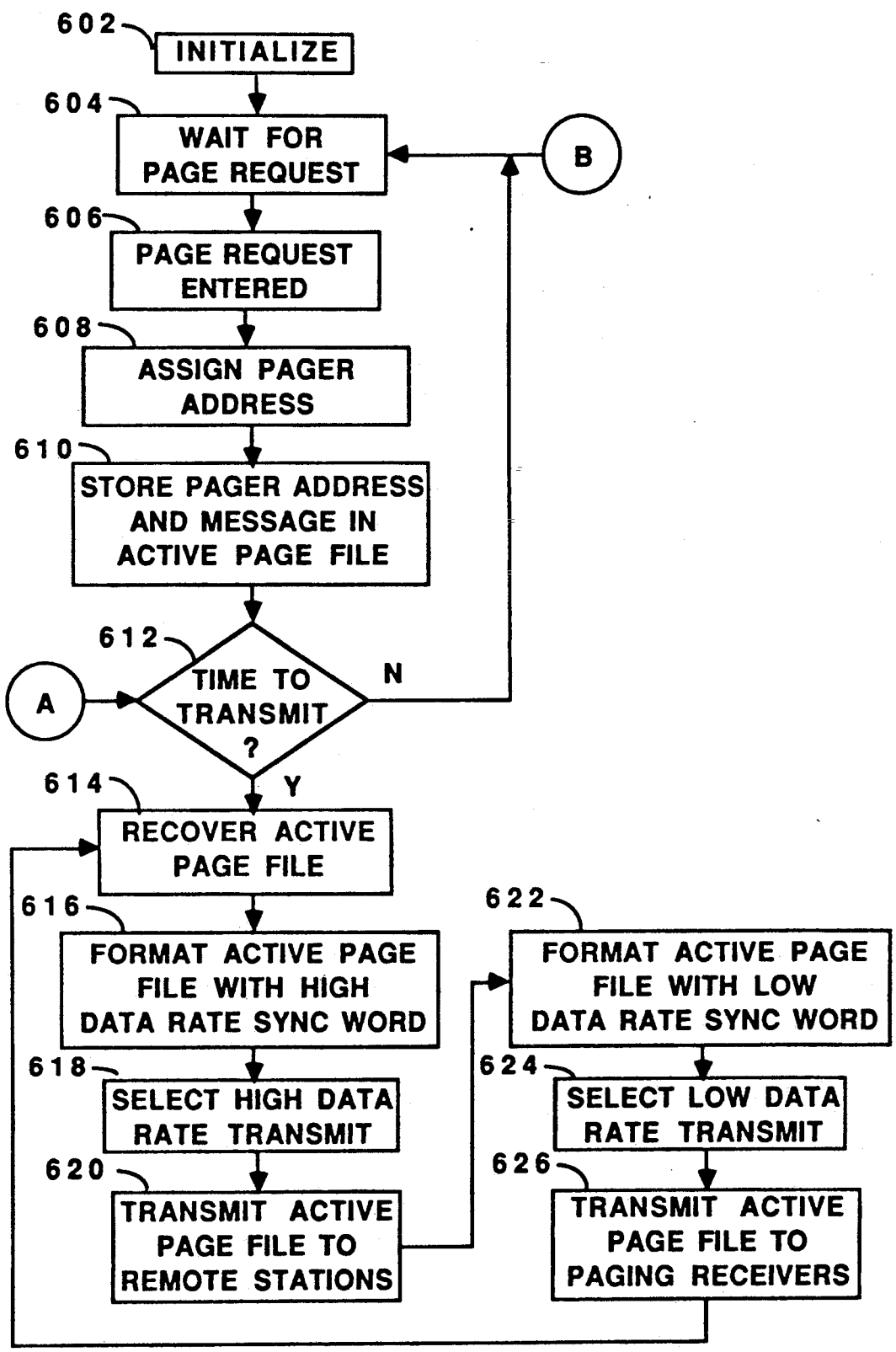
FIG. 6A is a flow chart describing the operation the central transmitter station for the multiple transmitter message transmission system of the present invention.

FIG. 6A is a flow chart describing the operation the central transmitter station for the multiple transmitter message transmission system of the present invention. When the system is initially brought on-line the central transmitter station timing and operation is initialized, at step 602. The paging terminal awaits for a page request from a message originator, at step 604. When a page request is received from a message originator, at step 604, the page request is accepted by the paging terminal, at step 606. The paging terminal assigns a paging receiver address corresponding to the pager for which the message is intended, at step 608. The paging receiver address and corresponding message are initially stored in an active page file, at step 610. During the message delivery time interval additional messages are being received and stored in the active page file, at steps 604-610. The central station controller monitors whether the system is to be delivering messages to the paging receivers, or distributing message packets to the remote transmitter stations. When it is time to deliver the messages to the remote transmitter stations, at step 612, the active page file is recovered from memory, at step 614, and formatted for transmission, at step 616. The address and message information is encoded into the signaling format utilized within the system, and the high speed synchronization code word is appended to the beginning of the encoded active page file. The controller selects the timing for the high speed transmission, at step 618, and the formatted active page file is transmitted as a message packet to the remote transmitter stations, at step 620. After the distribution of the message packet, at step 620, the encoded active page file is re-formatted appending the low speed synchronization code word to the beginning of the encoded active page file, at step 622. The controller selects the timing for the low speed transmission, at step 624, and the re-formatted active page file is transmitted, at step 626, delivering the message information the the paging receivers for which the messages are intended. In summary, the received messages are encoded into messages packets at the central transmitter station for distribution at a high data bit rate to the remote transmitter stations during the message distribution time interval. After the message packet is delivered, the central transmitter station and the remote transmitter stations simulcast transmit the message information at a lower data bit rate for delivery of the message information to the paging receivers for which the messages are intended.

Figure 6B:
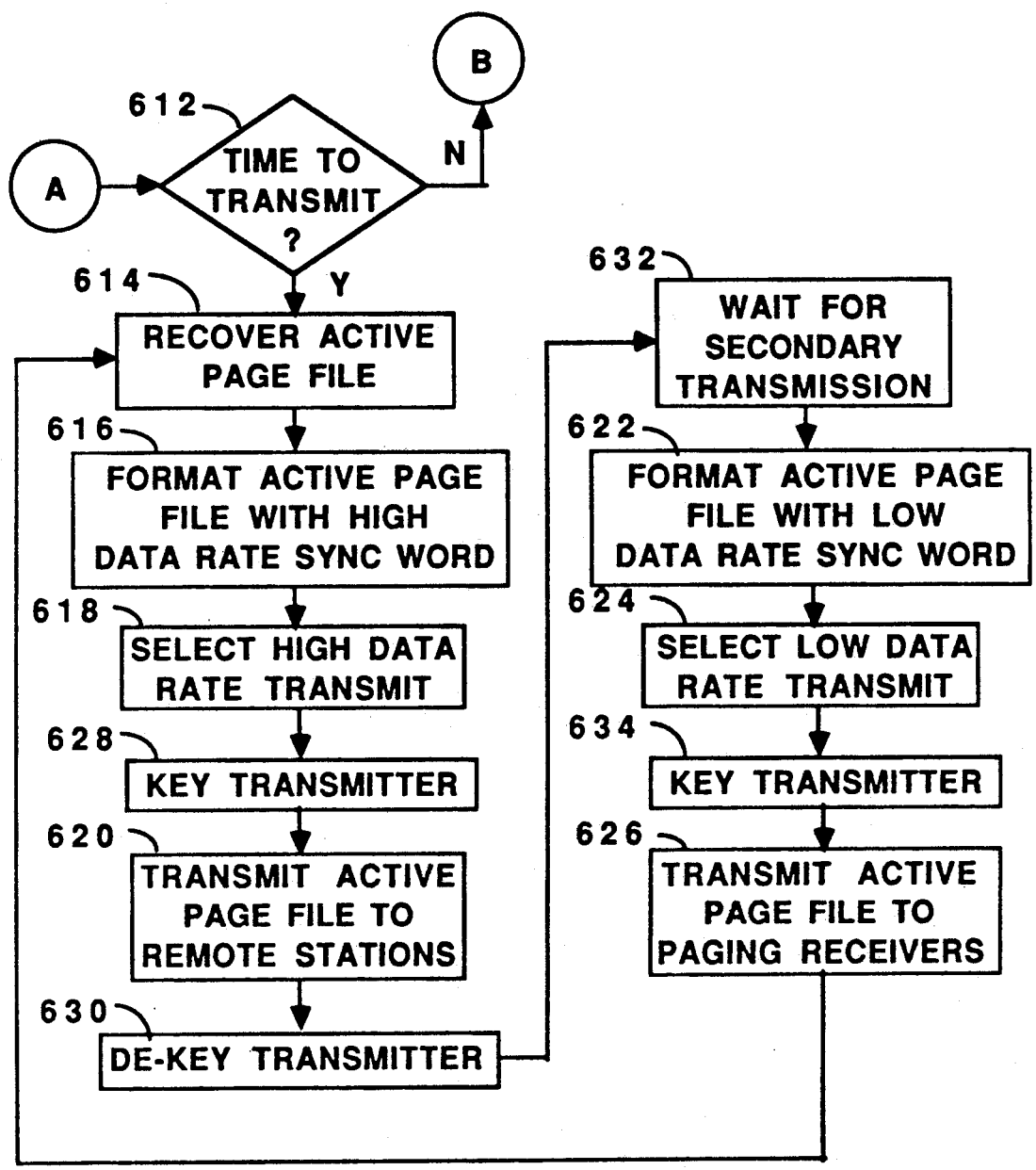
FIG. 6B is a flow chart describing the operation the central transmitter station utilized with message packet re-transmission for the multiple transmitter message transmission system of the present invention.

FIG. 6B is a flow chart describing the operation the central transmitter station utilized with message packet re-transmission for the multiple transmitter message transmission system of the present invention. When it is time to distribute the message packets, at step 612, the active page file is recovered from memory, at step 614 and formatted for transmission, at step 616. The address and message information is encoded into the signaling format utilized within the system, and the high speed synchronization code word is appended to the beginning of the encoded active page file. The controller selects the timing for high speed transmission, at step 618, and keys the central transmitter station transmitter, at step 628, allowing the encoded active page file to be transmitted as a message packet to the remote transmitter stations for message distribution, at step 620. The central transmitter station transmitter is then de-keyed at step 630. The controller then awaits for the secondary message distribution transmission to be made from the selected remote transmitter stations, at step 632. After the distribution of the message packet is complete, at step 632, the encoded active page file is re-formatted appending the low data bit rate synchronization code word to the beginning of the formatted active page file, at step 622. The controller selects the timing for low speed transmission, at step 624. The central transmitter station transmitter is again keyed, at step 634, and the re-formatted active page file is transmitted, at step 626, delivering the message information the the paging receivers for which the messages are intended. In summary, messages which have been received and encoded into messages packets at the central transmitter station are distributed at at a high data bit rate to the remote transmitter stations during the message distribution time interval. The message packet is further re-transmitted from selected remote stations for further distribution to other remote stations. After the message packet is delivered, the central transmitter station and the remote transmitter stations simulcast transmit the message information at a lower data bit rate for delivery of the message information to the paging receivers for which the messages are intended.

Figure 6C:
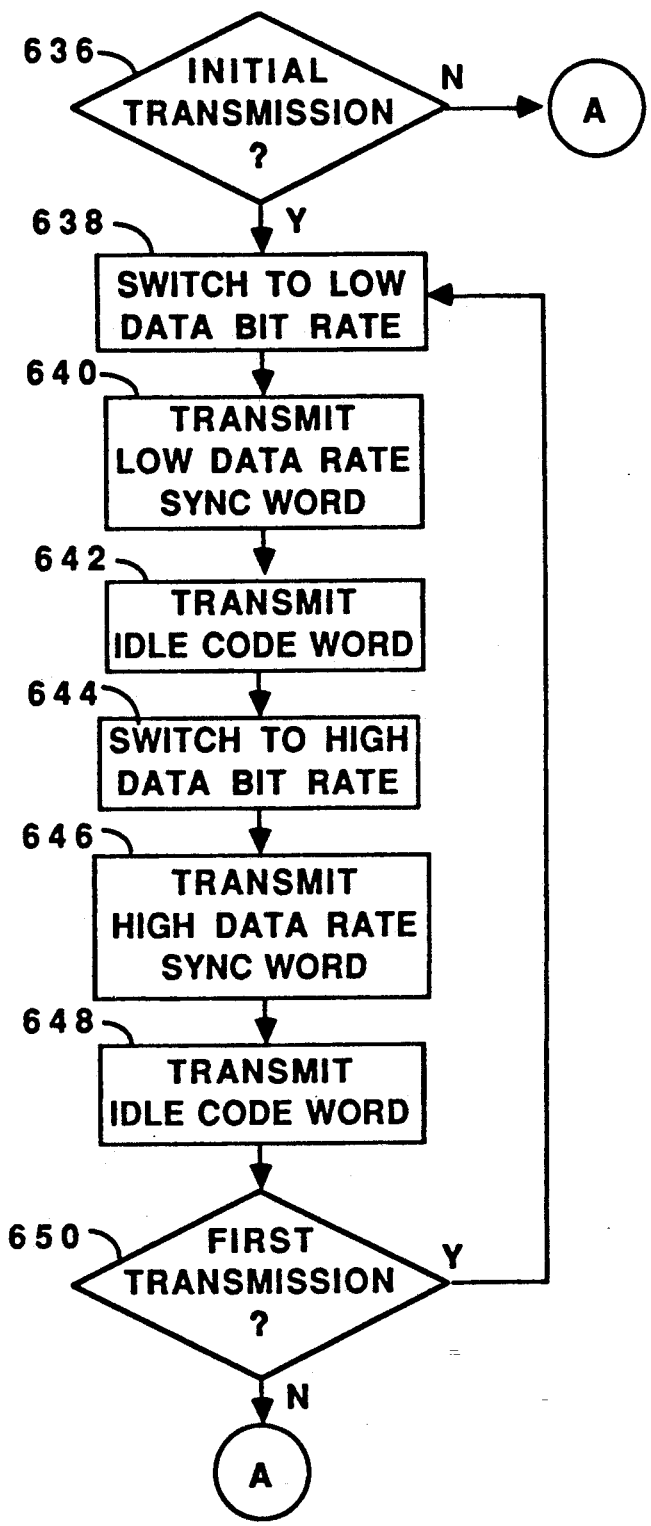
FIG. 6C is a flow chart describing the operation the central transmitter station during system synchronization for the multiple transmitter message transmission system of the present invention.

FIG. 6C is a flow chart describing the operation the central transmitter station during system synchronization for the multiple transmitter message transmission system of the present invention. When the system has been down for a period of time, such as when messages traffic is low during the evening and nighttime hours, the remote transmitter stations must be re-synchronized with the central transmitter station transmissions. The central station controller check to determine if the current transmission is an initial transmission, at step 636. When the transmission is not the initial transmission, at step 636, which indicates the remote transmitter stations are synchronized with the central transmitter station, the operation is as described in FIGS. 6A or 6B. Returning to FIG. 6C, when the transmission is an initial transmission, at step 636, the controller selects the timing for low speed transmission, at step 638, and the low speed synchronization code word is transmitted, at step 640. Following the low bit rate synchronization code word transmission, a block of idle code words is transmitted, at step 642, or silent carrier is transmitted for the remainder of the transmission time interval. The controller then selects the timing for high speed transmission, at step 644, after which the high speed synchronization code word is transmitted, at step 646. Following the high speed synchronization code word transmission, a block of idle code words is transmitted, at step 648, or silent carrier is transmitted for the remainder of the transmission time interval. The controller checks to determine if the synchronization transmission is the first transmission, at step 650. When the synchronization transmission is the first transmission, at step 650, the synchronization transmission is repeated, at steps 638-648, in order to insure all remote station transmitters are synchronized with the central transmitter station. When the synchronization transmission has been repeated, at least once, at step 650, the central transmitter station operation is as described in FIGS. 6A or 6B.

Figure 7A:
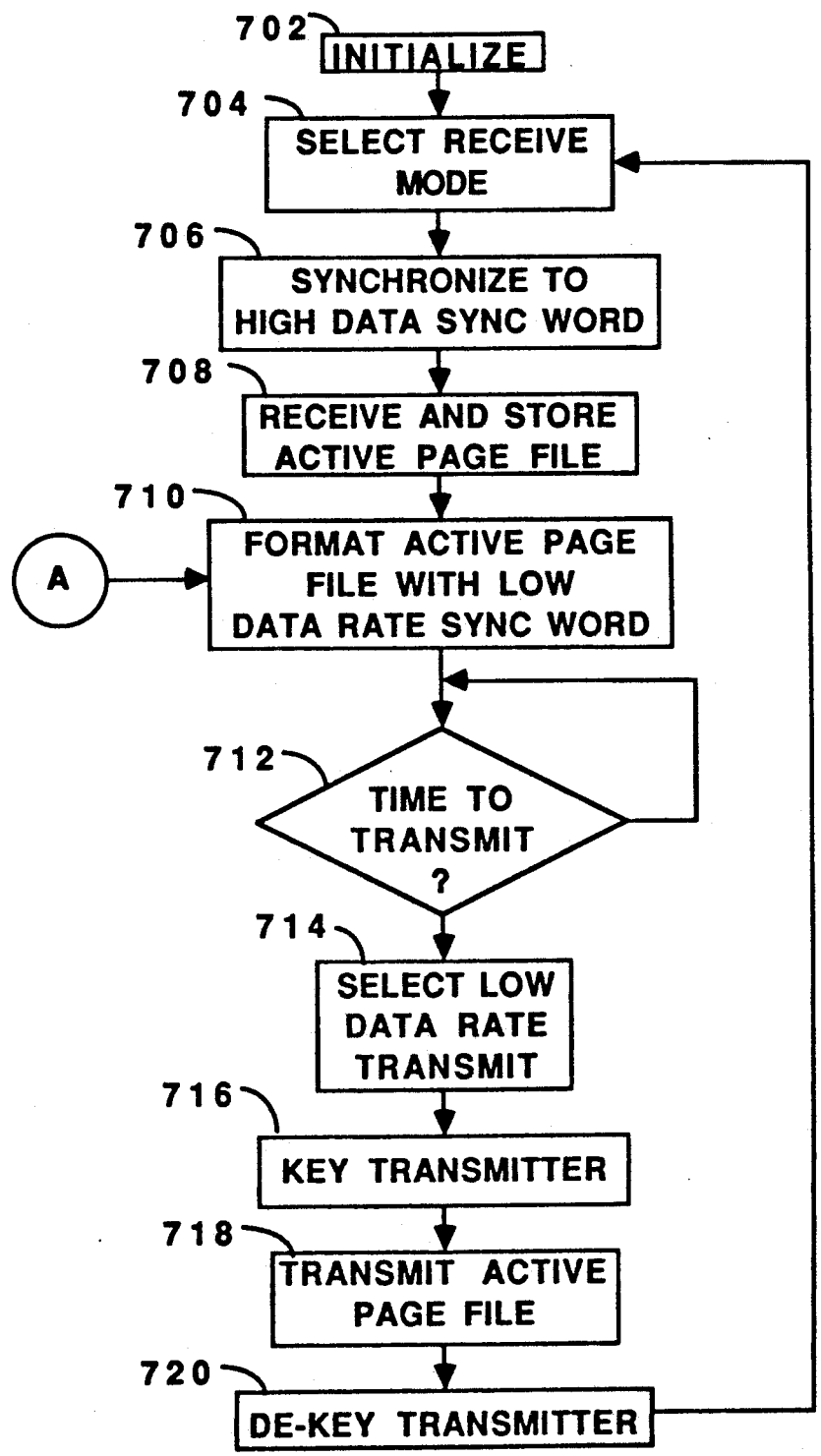
FIG. 7A is a flow chart describing the operation the remote transmitter station for the multiple transmitter message transmission system of the present invention.

FIG. 7A is a flow chart describing the operation the remote transmitter station for the multiple transmitter message transmission system of the present invention. When the system is initially brought on-line the remote transmitter station operation is initialized, at step 702. Initialization includes synchronizing the remote transmitter stations with the central transmitter station. For purposes of description, it is assumed the remote transmitter stations are synchronized with the transmission from the central transmitter station. When the remote transmitter stations are synchronized, the remote transmitter station selects the receive mode, at step 704, and receives the high speed synchronization code word transmission, at step 706, adjusting the synchronization of the remote transmitter station timing. The message packet transmitted from the central transmitter station is received, at step 708, and the encoded active page file is temporarily stored. The active page file is re-formatted with the low speed synchronization code word, at step 710. When the remote transmitter station controller determines it is time to simulcast transmit the message information, at step 712, the timing for the low data bit rate transmission is selected, at step 714. The controller keys the remote transmitter station transmitter, at step 716, and the re-formatted active page file is simulcast transmitted by the central transmitter station and each of the remote transmitter stations, at step 718. The remote transmitter station transmitter is then de-keyed, at step 720, after which time steps 704-718 are repeated. In summary, message packets received from the central transmitter station at the high data bit rate are reformatted for transmission by the remote transmitter stations for transmission at a low data bit rate. The message information transmitted at the low data bit rate is simulcast transmitted by the central transmitter station and each of the remote transmitter stations.

Figure 7B:
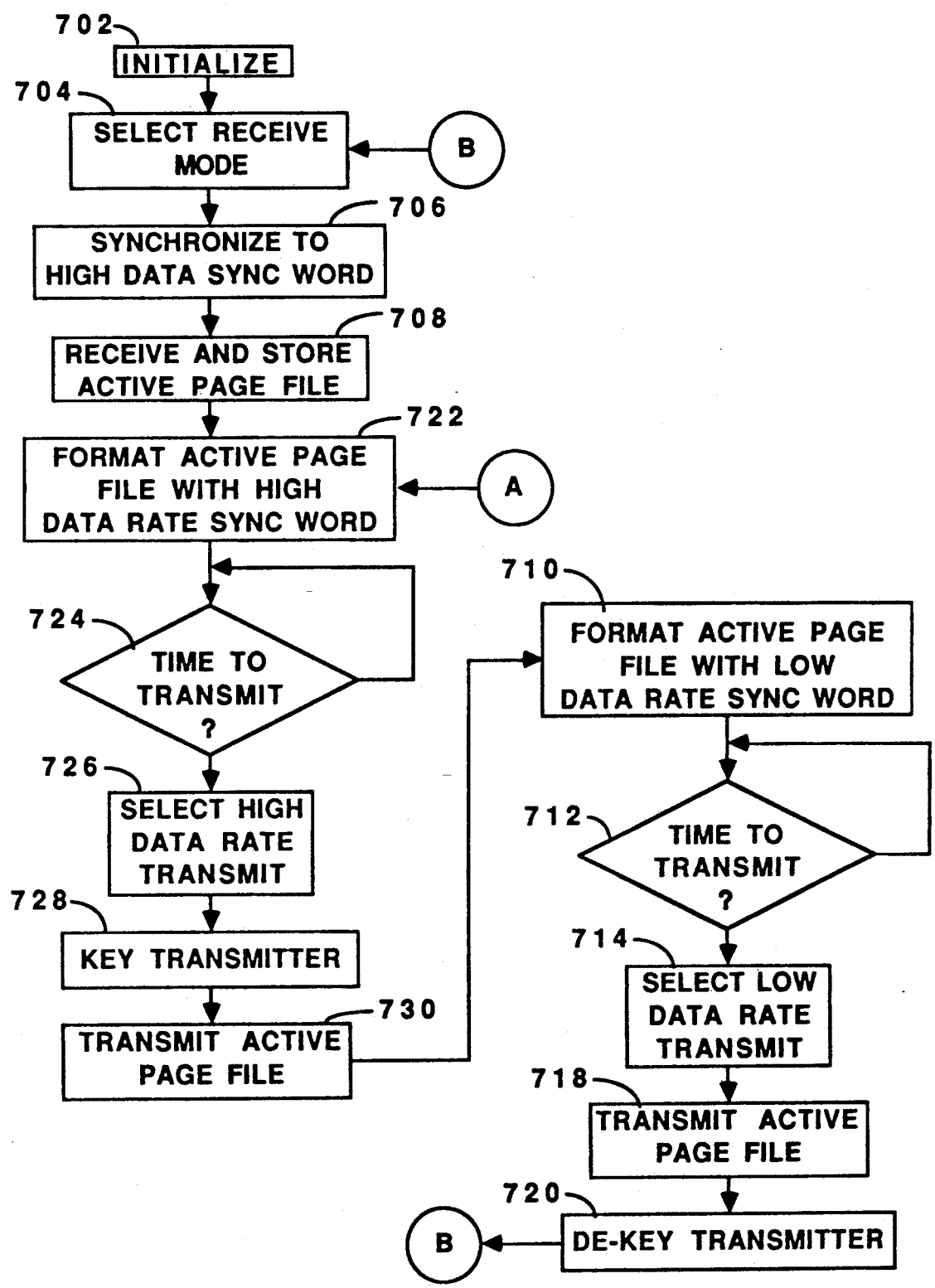
FIG. 7B is a flow chart describing the operation the remote transmitter station utilized with message packet re-transmission for the multiple transmitter message transmission system of the present invention.

FIG. 7B is a flow chart describing the operation the remote transmitter station utilized with message packet re-transmission for the multiple transmitter message transmission system of the present invention. When the system is initially brought on-line the remote transmitter stations operation is initialized, at step 702. Initialization includes synchronization of the remote transmitter station with the central transmitter station. For purposes of description, it is assumed the remote transmitter stations are synchronized with the transmission from the central transmitter station. When the remote transmitter stations are synchronized, the remote transmitter station selects the receive mode, at step 704, and receives the high speed synchronization code word transmission, at step 706, adjusting the synchronization of the remote transmitter station timing. The message packet transmitted from the central transmitter station is received, at step 708, and the encoded active page file is temporarily stored. The active page file is re-formatted with the high speed synchronization code word, at step 722, at the selected remote transmitter station which will re-transmit the message packet information to other remote transmitter stations located within the multiple transmitter message transmission system. When the controller determines it is time to transmit, at step 724, the controller selects the timing for the low speed transmission, at step 726. The controller keys the transmitter, at step 728, an the re-formatted active page file is transmitted as a message packet, at step 730. Following the re-transmission of the message packet, at step 730, the active page file is again re-formatted with the low data bit rate synchronization code word, at step 710. When the remote transmitter station controller determines it is time to simulcast transmit the message information, at step 712, the timing for the low speed transmission is selected, at step 714. The controller maintains the transmitter keyed, and the re-formatted active page file is simulcast transmitted by the central transmitter station and each of the remote transmitter stations, at step 718. The remote transmitter station transmitter is then de-keyed, at step 720, after which time steps 704–718 are repeated. In summary, message packets received from the central transmitter station at a high data bit rate are re-transmitted from selected remote transmitter stations for further message distribution. The message information is then re-formatted for transmission by the remote transmitter stations for transmission at a low data bit rate. The message information transmitted at the low data bit rate is simulcast transmitted by the central transmitter station and each of the remote transmitter stations.

Figure 7C:
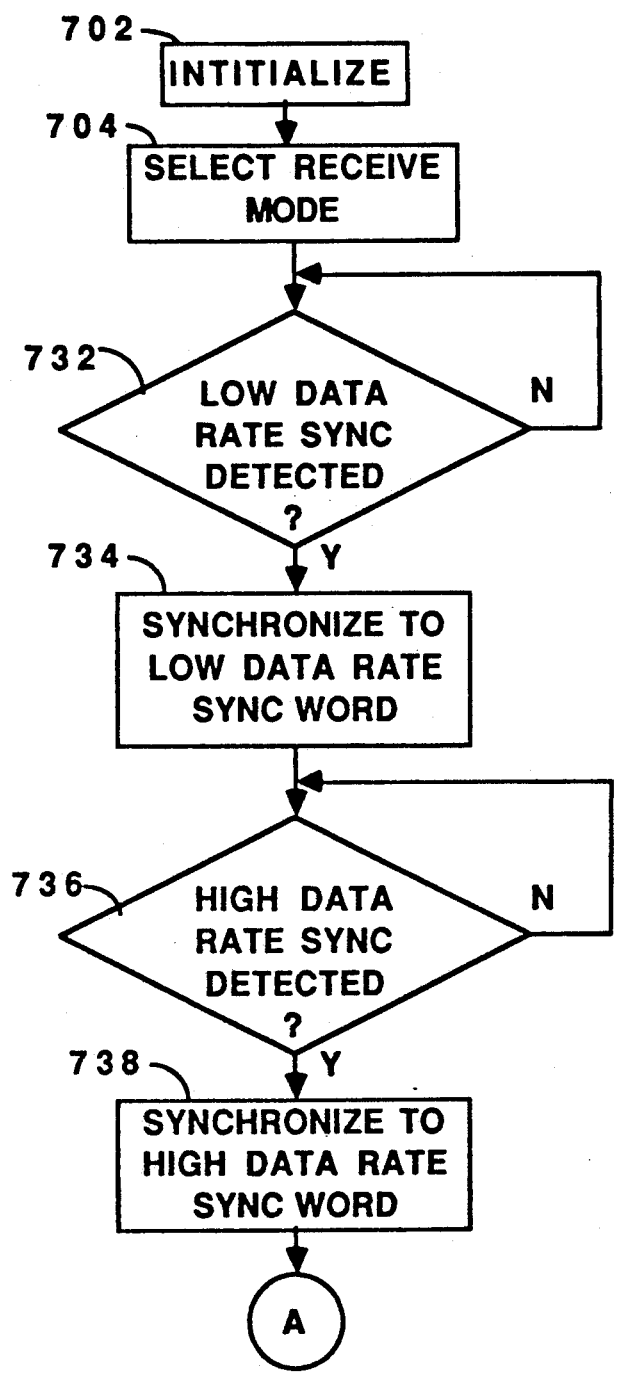
FIG. 7C is a flow chart describing the operation the remote transmitter station during system synchronization for the multiple transmitter message transmission system of the present invention.
Figure 8:
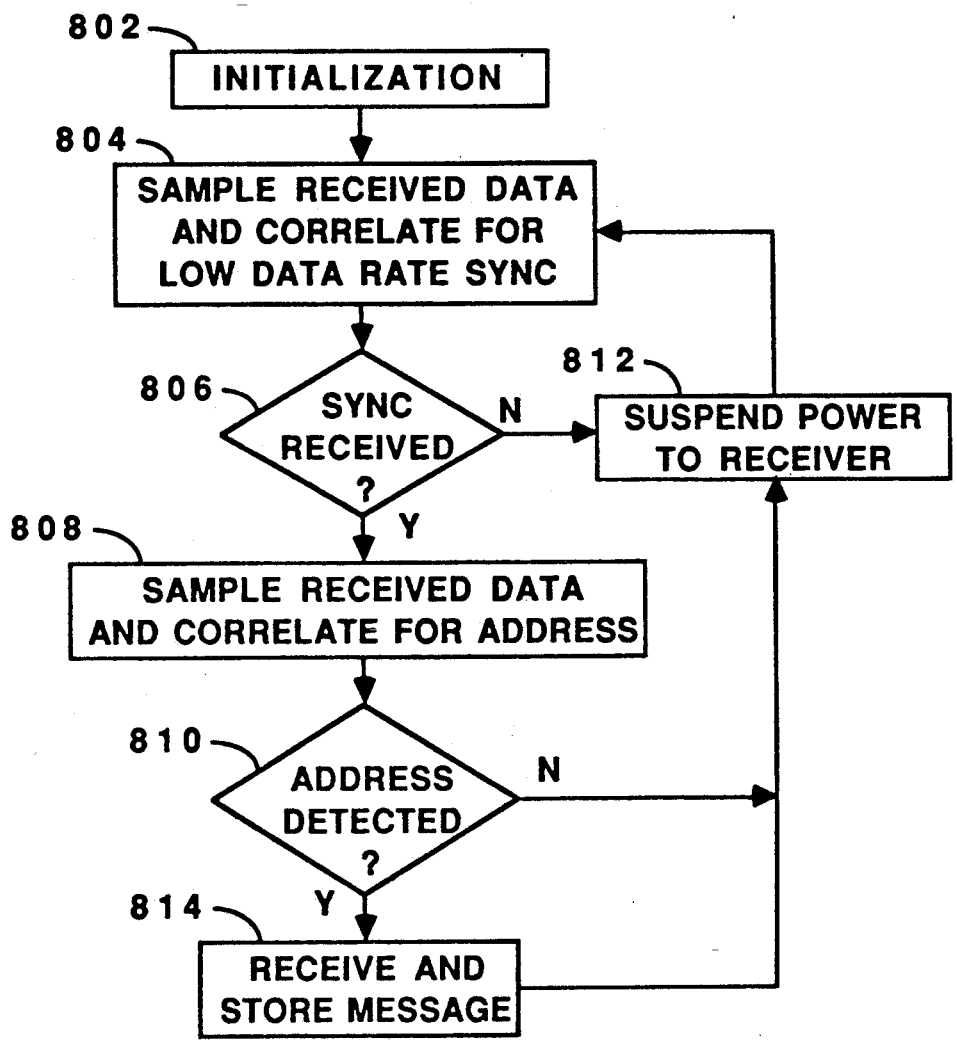
FIG. 8 is a flow chart describing the operation a paging receiver operating within the multiple transmitter message transmission system of the present invention.

FIG. 7C is a flow chart describing the operation the remote transmitter station during system synchronization for the multiple transmitter message transmission system of the present invention. When the system is initially brought on-line the remote transmitter station operation is initialized, at step 702. Initialization includes selection of the receive mode, at step 704. When the receiver is placed in the receive mode, at step 704, the information received and detected on the channel is processed by the low speed synchronization detector which is looking for the low speed synchronization code word. When the low speed synchronization code word is detected, at step 732, a coarse synchronization of the timing signals to the transmitted information is obtained, at step 734. The information received and detected on the channel is next processed by the high speed synchronization detector which is looking for the high speed synchronization code word. When the high speed synchronization code word is detected, at step 736, a fine synchronization of the timing signals to the transmitted information is obtained, at step 738, completing the initial synchronization of the remote transmitter station with the central transmitter station. Thereafter synchronization with the central transmitter station is maintained during the message packet transmission received during the message distribution time interval.

FIG. 8A is a flow chart describing the operation a paging receiver operating within the multiple transmitter message transmission system of the present invention. When power is applied to the paging receiver the microcomputer decoder/controller is initialized, at step 802. Pager address and function information is read from the code plug at this time. Power is supplied to the receiver and the received data is sampled and correlated for the low data bit rate synchronization code word, at step 804. When the synchronization code word is not received within a predetermined period of time, at step 806, the supply of power to the receiver is suspended, at step 812, for a predetermined period of time, until the next time during which power is reapplied to the receiver to allow the received data to be sampled and correlated for the low data bit rate synchronization code word, at step 804. When the low data bit rate synchronization code word is detected, at step 806, the decoder synchronizes with the synchronization code word, in a manner well known in the art, and begins sampling the received data, correlating for the paging receiver's assigned address, at step 808. When an address is not received during the predetermined address transmission time interval, at step 810, power is suspended to the receiver, at step 812, until the next anticipated transmission of the synchronization code word. When an address is detected, at step 810, indicating a message intended for the paging receiver is being transmitted, the message is received and stored, at step 814, and the user is alerted to the reception of the message. After the reception of the message, at step 814, power is suspended to the receiver, until the next anticipated transmission of the synchronization code word. When power is suspended to the receiver, the time interval during which power is suspended is extended to allow for the distribution of the message packets between the central transmitter station and the remote transmitter stations, and further to allow for any re-transmission of the message packet information.

In summary, a multiple transmitter message transmission system provides for the distribution of message packets from a central transmitter station to a plurality of remote transmitter stations on a common channel on which the messages are delivered by simulcast transmissions from the central transmitter station and the plurality of remote transmitter stations to a plurality of paging receivers operating within the system. The system is capable of functioning with a variety of signaling protocols, and reduces the number of channels required for message distribution and delivery to a single common channel.

While specific embodiments of this invention have been shown and described, further modifications and improvements will occur to those skilled in the art. All modifications which retain the basic underlying principles disclosed and claimed herein are with the scope and spirit of the present invention.

I claim:

1. A method for delivering a message to a communication receiver operating in a communication system comprising a plurality of transmission cells defining transmission areas, each transmission cell having a cell transmitter and a cell receiver operating on a common channel with the communication receivers, said method comprising the steps of:

transmitting a message packet including the message intended for the communication receiver at a first data bit rate on the common channel, the message packet being transmitted from a predetermined one of the cell transmitters located within one of the plurality of transmission cells;

receiving the transmitted message packet by the cell receivers located within the other of the plurality of transmission cells; and transmitting the message packet for delivery of the messages intended for the communication receiver from each of the cell transmitters within each of the plurality of transmission cells at a second data bit rate on the common channel.

2. The method of claim 1, wherein the second data bit rate is lower than the first data bit rate.

3. The method of claim 1 wherein said second step of transmitting simulcast transmits the message packets from each of the plurality of cell transmitters.

4. The method of claim 1 wherein said second step of transmitting sequentially transmits the message packets from each of the plurality of cell transmitters.

5. The method of claim 1 wherein said second step of transmitting simulcast transmits the message packets from a plurality of selected groups of the plurality of cell transmitters in a predetermined sequence.

6. The method of claim 1, wherein said first step of transmitting transmits the message packet at the first data bit rate during a first predetermined time interval, and further wherein said second step of transmitting transmits the message packet at the second data bit rate during a second predetermined time interval.

7. The method of claim 6 further comprising said steps of:
   synchronizing the cell receivers for reception of the message packet transmitted at the first data bit rate on the common channel during the first predetermined time interval; and
   synchronizing the cell transmitters for transmission of the message packet at the second data bit rate during the second predetermined time interval.

8. The method of claim 7 further comprising said step of synchronizing the communication receiver for receiving the message packet transmitted at the second data bit rate on the common channel during the second predetermined time interval.

9. A method for delivering a message to a communication receiver operating in a communication system comprising a plurality of transmission cells defining at least first and second co-located transmission regions, each transmission cell in each region having a cell transmitter and a cell receiver operating on a common channel with the communication receiver, said method comprising the steps of:
   transmitting the message packet at a first data bit rate on the common channel, the message packet being transmitted from a predetermined one of the cell transmitters located within the first transmission region;
   receiving the transmitted message packet by the cell receivers located within the other of the plurality of transmission cells within the first transmission region;
   further receiving the transmitted message packet by a predetermined one of the cell receivers located within the second transmission region;
   retransmitting, within the second transmission region, the message packet at the first data bit rate on the common channel, the message packet being retransmitted from the cell transmitter associated with the predetermined one of the cell receivers which received the message packet transmitted within the first transmission region; and
   transmitting the message packet at a second data bit rate on the common channel for delivery of the message intended for the communication receiver from each of the cell transmitters within the first and second transmission regions.

10. The method of claim 9, wherein the second data bit rate is lower than the first data bit rate.

11. The method of claim 9, wherein said step of transmitting the message packet at the second data bit rate simulcast transmits the message packets from each of the plurality of cell transmitters.

12. The method of claim 9 wherein said step of transmitting the message packet at the second data bit rate simulcast transmits the message packets from a plurality of selected groups of the plurality of cell transmitters in a predetermined sequence.

13. The method of claim 9, wherein
   said step of transmitting the message packet at the first data bit rate transmits the message packet during a first predetermined time interval,
   said step of retransmitting the message packet at the first data bit rate transmits the message packet during a second predetermined time interval, and
   said second step of transmitting the message packet at the second data bit rate transmits the message packet during a third predetermined time interval.

14. The method of claim 13 further comprising the steps of:
   synchronizing the cell receivers in the first transmission region, and the predetermined one of the cell receivers in the second transmission region, for reception of the message packet transmitted at the first data bit rate on the common channel during the first predetermined time interval;
   synchronizing the cell receivers in the second transmission region for reception of the message packet transmitted at the first data bit rate on the common channel during the second predetermined time interval; and
   synchronizing the cell transmitters in each transmission region for transmission of the message packet at the second data bit rate during the third predetermined time interval.

15. The method of claim 14 further comprising said step of synchronizing the communication receiver for receiving the message packet transmitted at the second data bit rate on the common channel during the third predetermined time interval.

16. A multiple transmitter message transmission system providing systemwide message distribution to a plurality of transmission areas on a common communication channel which is also utilized for the delivery of a message intended for a communication receiver operating within the system, said system comprising:
   a primary transmitter means, providing transmission coverage for the plurality of transmission areas, for transmitting a message packet at a first predetermined data bit rate on the common channel for distribution of the same throughout the plurality of transmission areas,
   said primary transmitter means, subsequently for transmitting the message packet at a second data bit rate on the common channel, for delivery of the message intended for the communication receiver within a predetermined one of the plurality of transmission areas;
   receiver means, located within each of the other of the plurality of transmission areas, for receiving the message packet transmitted at the first data bit rate on the common channel; and
   secondary transmitter means for providing transmission coverage for each of the other of the plurality of transmission areas, and being responsive to the message packet received at the first predetermined data bit rate, for subsequently transmitting the message packet at the second data bit rate on the common channel for delivery of the message intended for the communication receiver within the other of the plurality of transmission areas.

17. The multiple transmitter message system of claim 16 wherein said primary transmitter means comprises:
   timing means for generating first and second bit timing signals;
   controller means, responsive to the first and second bit timing signals, for controlling the transmission of the message packet at the first predetermined data bit rate for a first predetermined time interval, and further for controlling the transmission of the message packet at the second predetermined data bit rate for a second predetermined time interval; and a cell transmitter, coupled to said controller means, for transmitting the message packet at the first and second predetermined data bit rates.

18. The multiple transmitter message system of claim 17 wherein the message packet comprises a synchronization code word, and an address and associated message, the address identifying the communication receiver for which the associated message is intended.

19. The multiple transmitter message system of claim 16 wherein said secondary transmitter means comprises:
synchronizing means responsive to a received first synchronization code word, for generating synchronization signals in response thereto;
secondary timing means, responsive to the first synchronization signals, for generating first and second recovered bit timing signals in response thereto;
controller means, responsive to the first and second bit timing signals, for controlling the reception of the message packet at the first predetermined data bit rate for the first predetermined time interval, and further for controlling the transmission of the messages at the second predetermined data bit rate for the second predetermined time interval;
receiver means, being responsive to said controller means, for receiving the message packet transmitted during the first predetermined time interval; and
a cell transmitter, being responsive to said controller means, for transmitting the messages during the second predetermined time interval.

20. The multiple transmitter message system of claim 19 wherein the first synchronization code word is transmitted at the first predetermine data bit rate.

21. The multiple transmitter message system of claim 20 wherein said synchronizing means is further responsive to a second predetermined synchronization code word for generating the synchronization signals in response thereto.

22. The multiple transmitter message system of claim 21 wherein the second synchronization code word is transmitted at the second predetermined data bit rate.

23. The multiple transmitter message system of claim 19 wherein said secondary transmitter means further comprises memory means, coupled to said controller means, for storing the received message packet.

24. The multiple transmitter message system of claim 16 wherein said second step of transmitting simulcast transmits the message packets from each of the plurality of cell transmitters.

25. The multiple transmitter message system of claim 16 wherein said second step of transmitting sequentially transmits the message packets from each of the plurality of cell transmitters.

26. The multiple transmitter message system of claim 16 wherein said second step of transmitting simulcast transmits the message packets from a plurality of selected groups of the plurality of cell transmitters in a predetermined sequence.

* * * * *

UNITED STATES PATENT AND TRADEMARK OFFICE
CERTIFICATE OF CORRECTION

PATENT NO. : 5,128,934

DATED : July 7, 1992

INVENTOR(S) : Leon Jasinski

It is certified that error appears in the above-identified patent and that said Letters Patent is hereby corrected as shown below:

Column 16, line 37, delete "receivers" and insert --receiver--.

Signed and Sealed this

Third Day of August, 1993

Attest:

MICHAEL K. KIRK

Attesting Officer

Acting Commissioner of Patents and Trademarks